2,802,524
ROLLED TRAILER AWNING RETAINING DEVICES

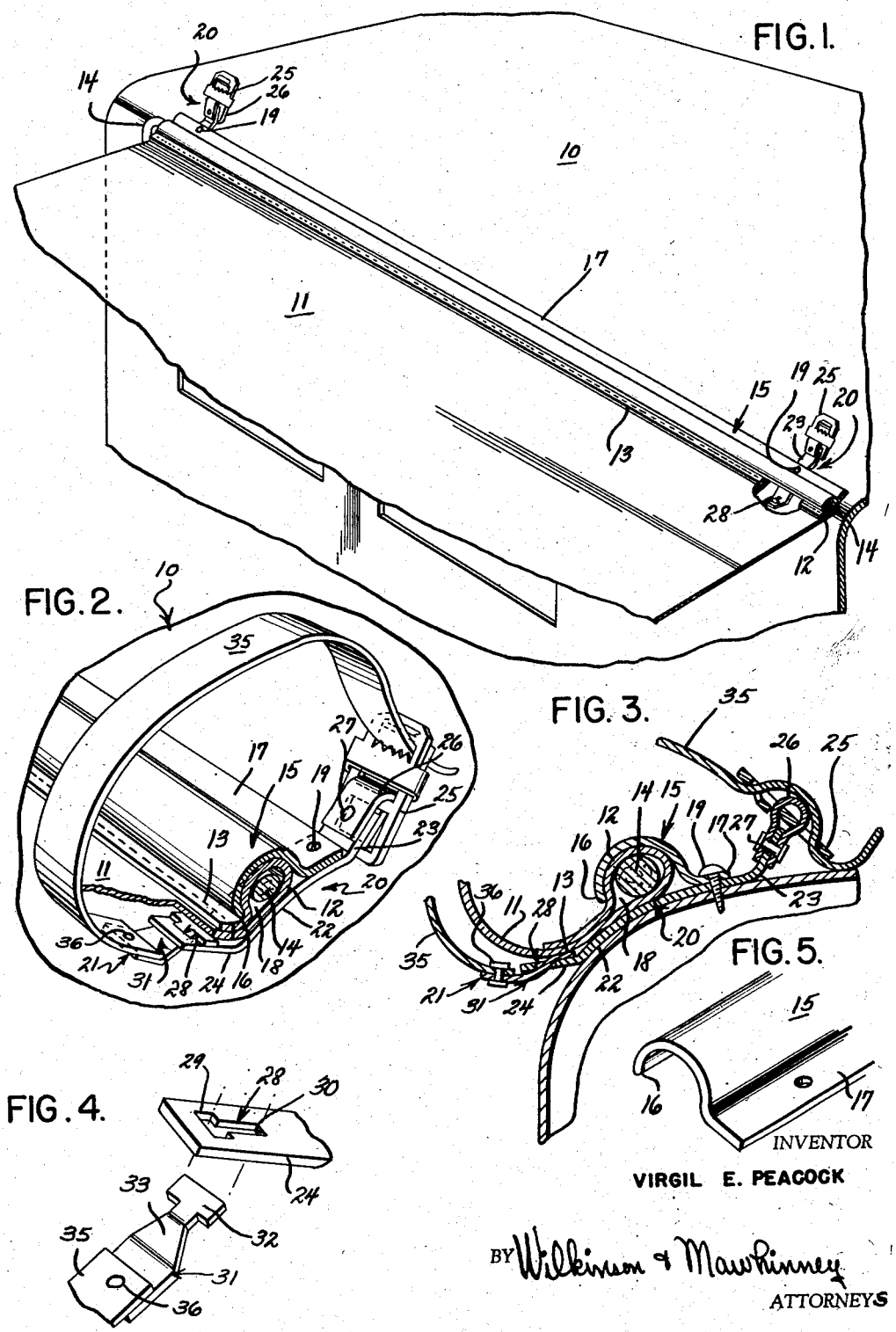

Virgil E. Peacock, Jackson, S. C.

Application August 4, 1953, Serial No. 372,327

2 Claims. (Cl. 160—323)

The present invention relates to rolled trailer awning retaining devices and has for an object to provide a removable fastening means for retaining the awning of a mobile house trailer in a compact rolled up condition for over-the-highway movement of the trailer.

Another object of the present invention is to provide an awning retaining device which may be removed without leaving unsightly dangling straps upon the trailer arriving at the new destination.

A still further object of the present invention is to provide a detachable two piece retaining device, one unit of which may be permanently installed upon a portion of the trailer body.

With the foregoing and other objects in view the invention will be more fully described hereinafter, and will be more particularly pointed out in the claims appended hereto.

In the drawings, wherein like symbols refer to like or corresponding parts;

Figure 1 is a fragmentary perspective view of a house-trailer having a device constructed in accordance with the present invention attached thereon;

Figure 2 is a perspective view with parts shown in section of the device of the present invention attached to a trailer;

Figure 3 is a side elevational view of the two piece awning retaining device in position upon a trailer with the awning in rolled position ready for transit;

Figure 4 is a fragmentary perspective view of the two piece awning retaining device in relative position prior to their connection; and Figure 5 is a fragmentary perspective view of a form of awning retaining clamp which may be employed with the present invention.

Referring more particularly to the drawings, 10 designates a house trailer or the like having an awning 11. The awning 11 is connected to the trailer as follows. The awning 11 has a looped end 12 made by folding an end of the awning back upon itself and stitching it at 13. A rope 14 is passed through the loop 12 to add at body or fullness thereto. The awning is retained in place upon the trailer roof by a retaining member 15 having a partially cylindrical jaw 16 and a flat attaching plate 17. The jaw portion 16 is adapted to overlie the looped end 12 of the awning 11 having the rope 14 therein.

When the member 15 is in place upon the trailer roof, the jaw 16 envelops the awning rope 14 over a circumferential area greater than one-half that of the rope and awning thereby prohibiting a pulling of the awning and rope 14 through a slot 18 lying between the free end of the jaw and the trailer roof. The member 15 is retained in place upon the roof of the trailer by screws 19 which pass through the flat attaching plate 17.

The retaining device may consist, for example, of two units 20 and 21.

The unit 20 may consist of three sections, an intermediate section 22 adapted to be attached to a trailer roof and underlie the awning retaining member 15, an upper section 23, and a lower section 24. The upper section 23 upstands angularly from the intermediate section 22 and is adapted to have a buckle 25 connected thereto by a loop strap 26 retained to the upper section by a rivet 27. The buckle may be of the conventional sliding jaw type. The lower section 24 has an inverted keyhole slot 28 therethrough with the enlarged lateral opening 29 situated toward the free end of said lower section. The intermediate section 22 may be provided with an opening 20 therethrough to permit passage of a screw 19 therethrough to prohibit shifting of the unit 20 in any direction.

The unit 21 may consist of a strap attaching lug 31 having a T-shaped head 32 at one end connected by a neck 33 having walls 34 convergent from the lug 31 to the connection of the head and neck. The planes of the head 32 and the lug 31 are offset due to bends where the neck 33 joins both the head 32 and lug 31. The minimum width of the neck 33 is slightly less than the opening 29 of the keyhole slot in unit 20 to permit rotation of the lug 31 about its own axis when the neck 33 is surrounded by the keyhole opening. The lower free end of the lug 31 may have attached thereto a flexible awning retaining strap 35 secured at one of its ends to the lug 31 by a rivet 36.

A plurality of the units 20 are secured to the trailer roof spaced horizontally along and beneath the attaching plate 17 of the retaining member 15 and the trailer roof. The units 20 are retained in place by the screws 19.

In use, the trailer awning retainer functions as follows.

The unit 20 is placed upon the roof of a trailer proximate the turn of the roof and a side wall. The intermediate section 22 is placed on the turn and a screw 19 is passed through the attaching plate 17 and opening 30 in the section 22.

The lower section 24 offstands from the side of the trailer providing clearance sufficient to render the keyhole slot 28 in said lower section accessible to the T-shaped head 32 carried by the attached shank 31 of unit 21. As illustrated, the intermediate section 22 may be curved to the counter of the turn of the trailer roof.

The trailer awning 11 is rolled towards its attached trailer end and upon completion of the rolling the unit 21 is presented for engagement with the unit 20 by introducing the attaching shank 31 at substantially a right angle to the lower section 24 of the unit 20 in such a way that the T-shaped head 32 enters the keyhole slot 28 and upon rotating the attaching shank 31 about its own axis through ninety degrees and pulling downwardly thereon the T-shaped head 32 and its connected neck 33 will gravitate to the lateral opening 29 where the side projecting portion of the head will take junction against the upper surface of the lower section 24. The flexible retaining strap 35 is then wrapped about the rolled awning and introduced between the jaws of the buckle 25 carried by the upper section 23 of unit 20. The upper section 23 of unit 20 extends off the intermediate section a sufficient distance to permit orientation of the buckle to accommodate the rolled awning and to permit the strap and buckle to partake of the circumferential contour of the rolled awning. In this condition, due to the bends in the neck 33 of unit 21, the head 32 of the unit 21 will lie flat against the upper surface of the lower section 24 of unit 20 thereby permitting the two sections attaching member to more nearly conform to the contour of the rolled awning.

Any suitable number of the units 20—21 may be employed for retaining an awning in a rolled condition for transit. The number employed is dependent upon the length of span of the awning to be supported. In the form of the invention illustrated I have found that two such pairs of units will adequately support the awning illustrated.

Upon arriving at the new destination the awning may be unfurled by removing the flexible strap 35 of unit 21 from the buckle 25 of unit 20, raising the unit 21 toward the trailer and rotating the shank 31 through ninety degrees placing the head 32 in registry with the keyhole slot 28 whereby upon pulling same downwardly, the unit 21 may be completely removed from contact with the trailer. This eliminates all unsightly appearance of non-utilitarian dangling straps when the awning is in its furled or set up condition.

Although I have disclosed herein the best form of the invention known to me at this time, I reserve the right to all such modifications and changes as may come within the scope of the following claims.

What is claimed is:

1. A rolled trailer awning retaining device comprising an awning, a bracket having a central attaching section adapted to be fastened to the turn of the trailer top, upper and lower sections on said central section, the lower section having a key hole slot therein with the laterally larger part of the slot disposed downward, a buckle attached to the upper section, means associated with one end of said awning and said central section for securing said end of the awning to said central section, a strap, and a T-head connection affixed to the strap and insertible and rotatable in the slot to detachably connect the strap to the lower section to retain the awning in rolled condition for movement of the trailer over the highway.

2. The device of claim 1 characterized by the fact that the T-head is connected to the strap by a shank which is offset from the plane of the T-head to permit the T-head to lie substantially flat against one face of the lower section while the shank lies flat against the other face of the lower section.

References Cited in the file of this patent
UNITED STATES PATENTS

| | | |
|---|---|---|
| 119,450 | Cornell et al. | Oct. 3, 1871 |
| 498,816 | Ross | June 6, 1893 |
| 1,113,781 | Griffin | Oct. 13, 1914 |
| 1,181,377 | Dowell | May 2, 1916 |
| 1,683,169 | De Noya | Sept. 4, 1928 |
| 1,765,099 | Rosen | June 17, 1930 |
| 2,528,173 | Pinckney | Oct. 31, 1950 |